United States Patent
Nozaki et al.

(10) Patent No.: US 6,601,345 B2
(45) Date of Patent: Aug. 5, 2003

(54) SEALING STRUCTURE FOR VEHICLE DOOR

(75) Inventors: Masahiro Nozaki, Nishikasugai-gun (JP); Katsunori Kawai, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/819,620

(22) Filed: Mar. 29, 2001

(65) Prior Publication Data

US 2001/0025455 A1 Oct. 4, 2001

(30) Foreign Application Priority Data

Mar. 29, 2000 (JP) ........................................ 2000-090248
Nov. 22, 2000 (JP) ........................................ 2000-355828

(51) Int. Cl.⁷ .................................................. E06B 7/16
(52) U.S. Cl. ...................................... 49/483.1; 49/495.1
(58) Field of Search ...................... 49/440, 441, 475.1, 49/490.1, 483.1, 495.1

(56) References Cited

U.S. PATENT DOCUMENTS

| | | | |
|---|---|---|---|
| 2,899,256 A | * 8/1959 | Kelley | 49/483.1 |
| 4,457,111 A | * 7/1984 | Koike | 49/441 |
| 4,492,405 A | * 1/1985 | Chikaraishi et al. | 49/483.1 |
| 4,932,161 A | * 6/1990 | Keys et al. | 49/490.1 |
| 5,024,480 A | * 6/1991 | Petrelli | 296/146 |
| 5,355,628 A | * 10/1994 | Dranchak | 49/483.1 |
| 5,791,723 A | * 8/1998 | Bell et al. | 49/483.1 |

FOREIGN PATENT DOCUMENTS

JP    4-110645    9/1992

* cited by examiner

*Primary Examiner*—Jerry Redman
(74) *Attorney, Agent, or Firm*—Posz & Bethards, PLC (57) ABSTRACT

A sealing structure for sealing between a door opening portion of a vehicle body, and a periphery of a vehicle door, includes a channel which is formed in an inside surface of a doorframe along a periphery thereof, and a projection which is composed of a rubber elastic body and is provided in the door opening portion of the vehicle body so as to face the channel. When the vehicle door is closed, the projection enters the channel to provide a seal between the vehicle body and vehicle door. The channel may be provided in the vehicle body while the projection may be provided in the vehicle door. The channel may be formed with a rubber elastic body.

5 Claims, 7 Drawing Sheets

SEALING STRUCTURE FOR VEHICLE DOOR

BACKGROUND OF THE INVENTION

1. Field of the Invention

The present invention relates to a door sealing structure for sealing between a door opening portion of a vehicle body and a periphery of a vehicle door.

2. Description of Related Art

The door sealing structure generally includes a weather strip which is attached along one or both of an inside surface of the periphery of the vehicle door, and the door opening portion of the vehicle body. The weather strip has a tubular seal portion which is adapted to contact and press against the facing door opening portion of the vehicle body, or the inside surface of the periphery of the vehicle door when the vehicle door is closed. (Publication of unexamined Japanese utility model application No. Hei 4-110645).

Figure 1:
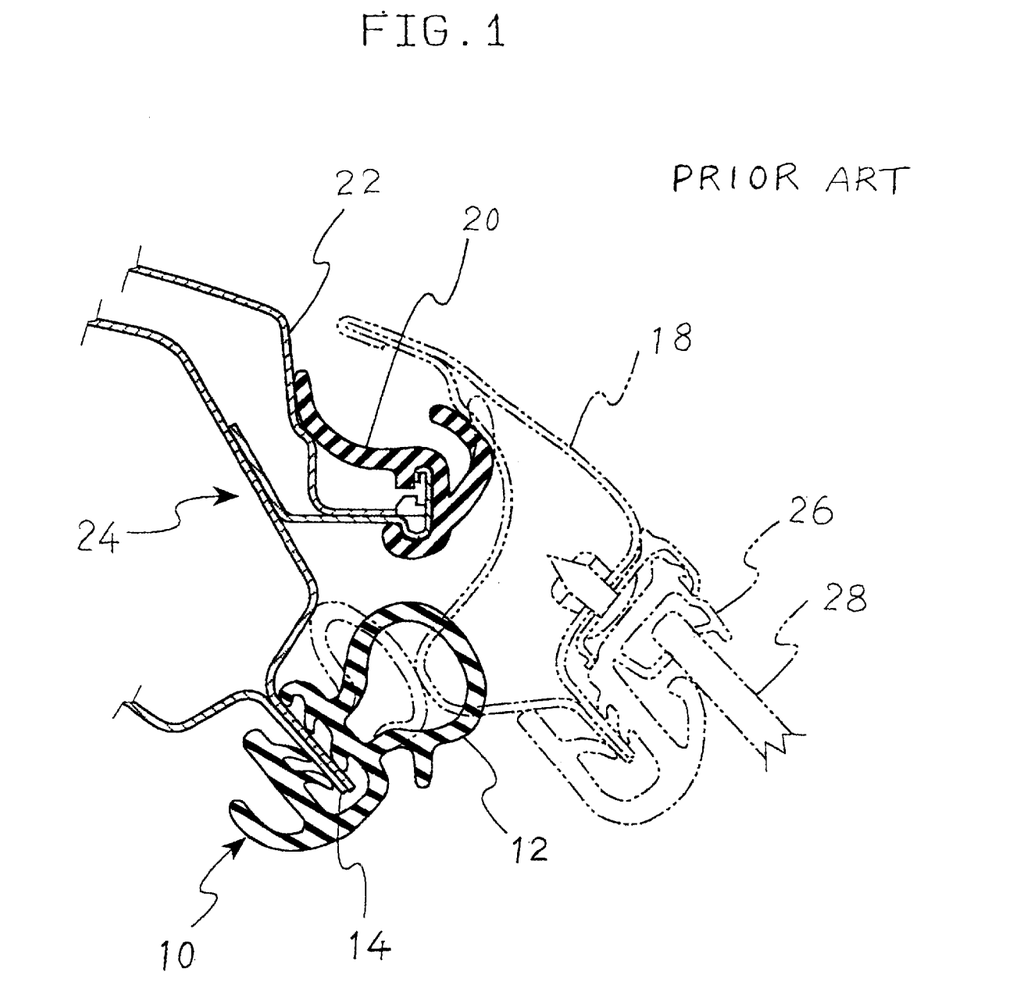
FIG. 1 is a cross-sectional view of a conventional sealing structure for a vehicle door, which is taken along the line Y—Y of FIG. 2.
Figure 2:
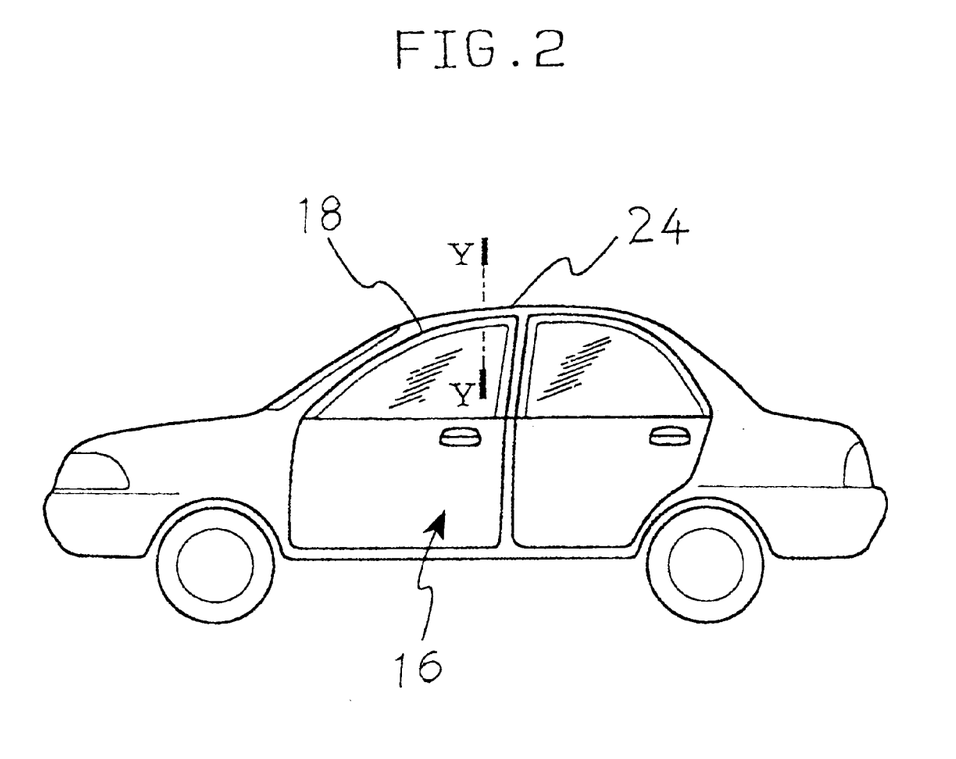
FIG. 2 is a side view of a motor vehicle.

FIG. 1 illustrates a cross-section of one typical example of conventional door sealing structures, which is taken along the line of Y—Y of FIG. 2. As shown, a trim 10 having a tubular seal portion 12 on an outside wall thereof is mounted on a flange 14 provided along a door opening portion of a vehicle body 24. When a vehicle door 16 (FIG. 2) is closed, the tubular seal portion 12 contacts and presses against a facing inside surface of a periphery of the vehicle door 16 (doorframe 18 in FIG. 1). In the drawing, reference numeral 20 denotes a sub-seal member attached to a roof side 22 of a vehicle body 24. When the vehicle door 16 (FIG. 2) is closed, an outside end of the sub-seal member 20 contacts and presses against the inside surface of the doorframe 18. And reference numeral 26 denotes a glass run attached to the doorframe 18 to seal between a door glass 28 and the doorframe 18.

The configuration of the door opening portion slightly varies with the position thereof. In addition, there occurs inevitable scattering in the mounted state of the vehicle door on the vehicle body. Consequently, the pressing state of the seal portion of the weather strip varies with the mounted position thereof. So, the conventional door sealing structure has a problem that uniform sealing performance cannot be achieved over the entire length of the door opening portion.

SUMMARY OF THE INVENTION

Accordingly, it is an object of the present invention to provide a sealing structure for a vehicle door, which is capable of forming a seal line with uniform sealing performance between a door opening portion of a vehicle body, and a periphery of the vehicle door irrespective of the variations in the configuration of the door opening portion, and the scattering in the mounted state of the vehicle door on the door opening portion.

In a first aspect of the present invention, the sealing structure for sealing between a door opening portion of a vehicle body, and a periphery of the vehicle door has a channel in one of the door opening portion, and the inside surface of the periphery of the vehicle door, which extends in a circumferential direction thereof, and also has a projection in the other thereof, which extends in a circumferential direction thereof such that, when the vehicle door is closed, a projecting end thereof enters the channel while contacting opposite side walls defining the channel. The wall defining the channel, or the projection is composed of a rubber-like elastic body. Since the sealing structure thus arranged enables the projection provided in one of the door opening portion and the periphery of the vehicle door to enter the channel provided in the other and closely contact the wall defining the channel, uniform sealing performance can be achieved over the entire length of a resultant seal line.

In a second aspect of the present invention, a channel is provided in one of the door opening portion and the inside surface of the periphery of the vehicle door, and a projection composed of a rubber-like elastic body is provided in the other thereof. Opposite side walls defining the channel are approximately parallel to the direction in which the projection enters the channel, and the projection defines a seal surface at a projecting end thereof, which slides on the opposite side walls defining the channel when the projection enters the channel. When the vehicle door is closed, the projection of rubber-like elastic body enters the channel smoothly while sliding on the opposite side walls defining the channel.

In a third aspect of the present invention, a channel is provided in one of the door opening portion and the inside surface of the periphery of the vehicle door such that opposite side walls defining the channel are inclined to each other to gradually enlarge the channel width from a bottom thereof towards an opening thereof, and a projection composed of a rubber-like elastic body is provided in the other thereof to define a seal surface at a projecting end thereof, which is adapted to slide on the opposite side walls defining the channel when the projection enters the channel. With this arrangement, the opening width of the channel is enlarged, and consequently, when the vehicle door is closed, the projecting end of the projection enters the opening of the channel smoothly irrespective of the scattering in the mounted state of the vehicle door on the vehicle body.

In a fourth aspect of the present invention, a channel is provided in one of the door opening portion and the inside surface of the periphery of the vehicle door using a rubber-like elastic member having an approximately U-shaped cross-section, of which the channel width is decreased toward the opening thereof, and a projection is provided in the other thereof to define a seal surface at a projecting end thereof, which is adapted to slide on ends of the side walls defining the channel, when the projection enters the channel when the vehicle door is closed, the projecting end of the projection slides on the ends of the side walls defining the channel, which are composed of a rubber-like elastic member, and enters the channel while pressing the ends of the side walls to enlarge the opening width of the channel In a fifth aspect of the present invention, the sealing structure has both of one channel and one projection in one of the door opening portion and the inside surface of the periphery of the vehicle door, which extend parallel to each other in a circumferential direction thereof, and further has both of another projection and another channel in the other thereof, which extend parallel to each other in a circumferential direction thereof, such that, when the vehicle door is closed, one projection enters another channel while another projection enters one channel. A wall defining one channel or another projection, and a wall defining another channel or one projection are respectively composed of a rubber-like elastic body. When the vehicle door is closed, a double seal is formed between the door opening portion of the vehicle body, and the periphery of the vehicle door.

In the preceding aspects, the term "rubber-like elastic body" or "rubber-like elastic member" has been used to mean a body or member which is formed of rubber, soft resin, thermoplastic elastomer, or the like to exhibit rubber-like elasticity.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 3:
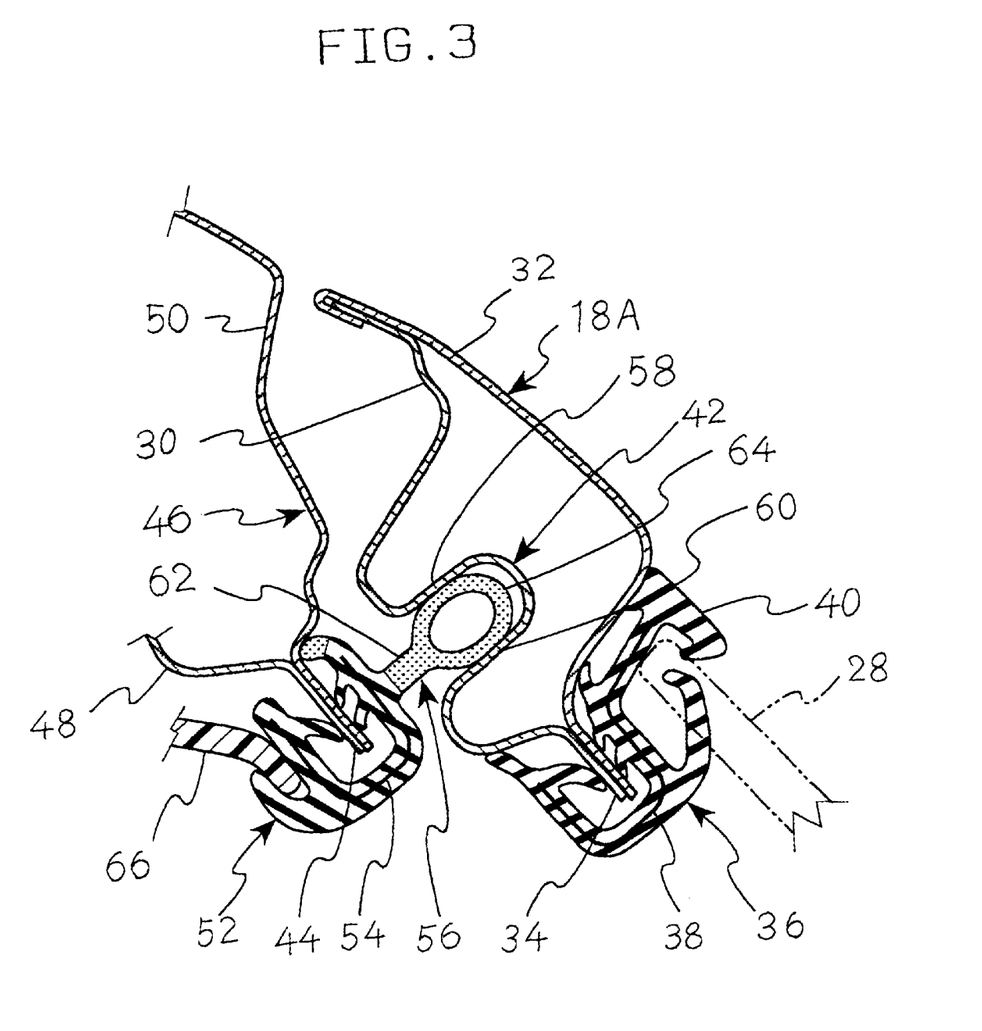
FIG. 3 is a cross-sectional view of a first embodiment of a sealing structure in accordance with the present invention, which is taken along the line Y—Y of FIG. 2.

FIG. 3 illustrates a first embodiment of a sealing structure in accordance with the present invention. A doorframe 18A of a door 16 (FIG. 2) has an inner panel 30 and outer panel 32. A flange 34 is formed around a window opening by joining end edges of the inner panel 30 and outer panel 32, and a trim 36 having a U-shaped cross-section, in which a metal insert 38 is embedded, is mounted on the flange 34. A glass run 40 for sealing around a periphery of a door glass 28 is integrally formed with an outside wall of the trim 36. A channel 42 is continuously formed in the inner panel 30 so as to extend in a circumferential (longitudinal) direction thereof.

A flange 44 is formed in a door opening portion 46 of a vehicle body by joining end edges of an inner panel 48 and outer panel 50, and a trim 52 in which a metal insert 54 is embedded is mounted on the flange 44. A projection 56 is integrally formed with an outside wall of the trim 52 so as to project outwardly of the vehicle body.

The channel 42 formed in the-doorframe 18A has a U-shaped cross-section which is identical over the entire length thereof, and opens towards the projection 56. Opposite side walls 58 and 60 for defining the channel 42 extend approximately parallel to the direction in which the vehicle door is opened and closed.

The trim 52 mounted along the door opening portion 46 is composed of a solid rubber while the projection 56 is composed of a sponge rubber. The projection 56 includes a leg portion 62 which stands on an outside wall of the trim 52, and a tubular seal portion 64 which is formed at an end of the leg portion 62. The seal portion 64 has a width slightly greater than that of the channel 42, that is the distance between the opposite side walls 58 and 60. The projection 56 is arranged such that just before the vehicle door is closed, the projecting direction of the projections 56 is identical to the extending direction of the side walls 58 and 60 of the channel 42, and the seal portion 64 is in alignment with an opening of the channel 42. In the drawing, reference numeral 66 denotes a garnish for covering a ceiling of a vehicle compartment.

In the sealing structure thus arranged, upon closing of the vehicle door, the tubular seal portion 64 of the projection 56 enters the channel 42, and elastically contacts the side walls 58 and 60 defining the channel 42. Since the side walls 58 and 60 respectively extend in the direction identical to the projecting direction of the projection 56, the seal portion 64 enters the channel 42 smoothly.

There is inevitably generated a slight difference between the extending direction of the side walls 58 and 60, and the projecting direction of the projection 56 in some positions of the door opening portion 46. This slight difference, however, can be cancelled by flexing of the leg portion 62 of the projection 56, and consequently there hardly occurs an increase in the friction resistance when the seal portion 64 enters the channel 42. The depth of the channel 42 and the height of the projection 56 are respectively determined such that, when the vehicle door is closed, the projecting end of the projection 56 is spaced from the bottom of the channel 42. Consequently, the vehicle door can be closed without any trouble.

When the vehicle door is closed, the channel 42 on the side of the vehicle door, and the projection 56 on the side of the vehicle body are sealed uniformly over the entire length thereof, and consequently uniform sealing performance is achieved over the entire length of a resultant seal line even if the relative position of the doorframe 18A and door opening portion 46 varies due to the scattering in the mounted state of the vehicle door on the vehicle body. Furthermore, since the side walls 58 and 60 defining the channel 42 are parallel to each other, and the width of the channel 42 is identical from a bottom to an opening thereof, the sealing pressure of the seal portion 64 of the projection 56 is constant irrespective of the variations in the entering depth into the channel 42. Consequently, by selecting the opening width of the channel 42 and the width of the seal portion 64, a proper sealing pressure can be determined, and a predetermined sealing pressure can be obtained over the entire length of a resultant seal line even if the mounted state of the vehicle door on the vehicle body scatters.

In the present embodiment, the sealing structure provided along a doorframe has been explained. The present invention can be also applied to the sealing structure provided along a door panel. Especially, the present invention achieves excellent operational advantages when applied to the sealing structure provided along a doorframe, which is required to exhibit especially severe sealing performance.

Figure 4:
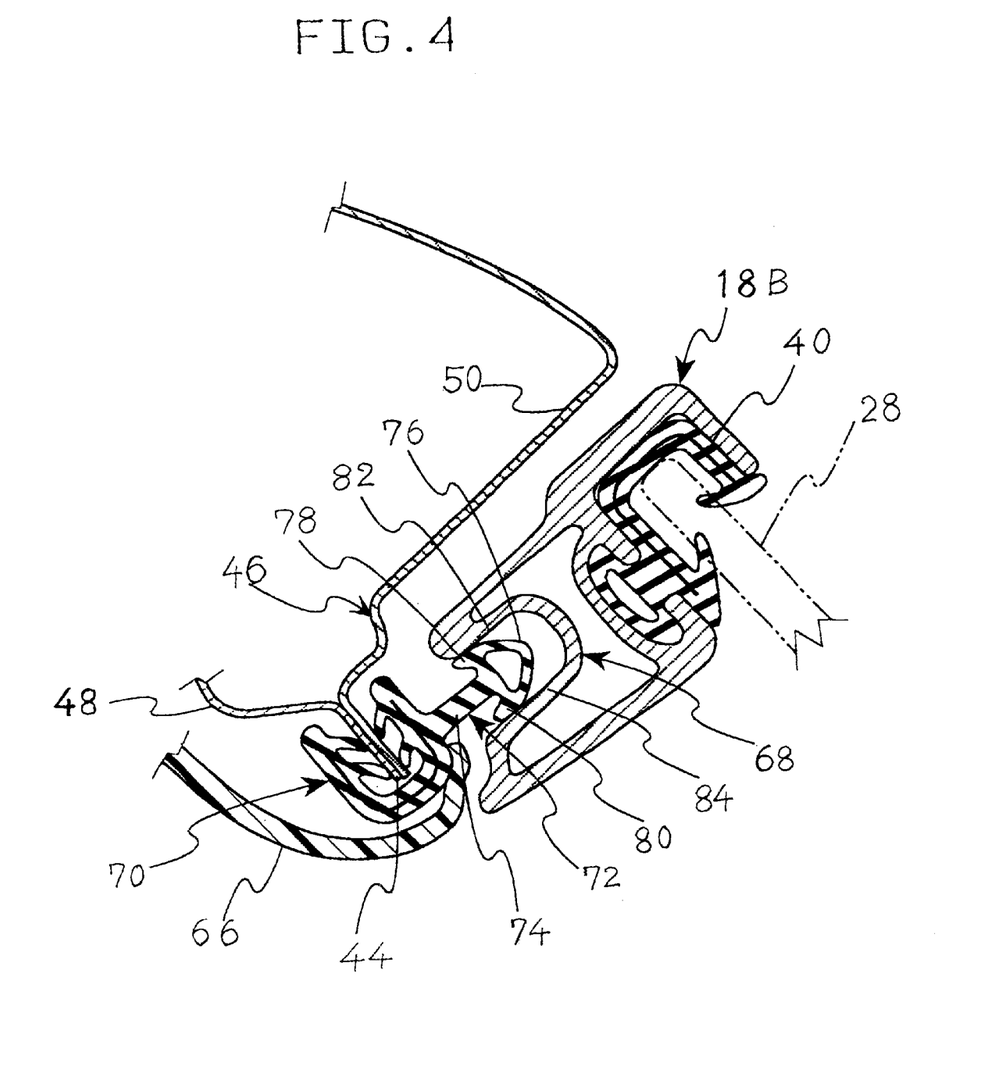
FIG. 4 is a cross-sectional view of a second embodiment of a sealing structure in accordance with the present invention, which is taken similarly to FIG. 3.

FIG. 4 illustrates a second embodiment of a sealing structure in accordance with the present invention.

A doorframe 18B is formed of an aluminum material to reduce the weight of a vehicle door. A channel 68 having a cross-section substantially identical to that of the channel 42 of the first embodiment is provided in an inside surface of the doorframe 18B. A trim 70 is mounted on a flange 44 of a door opening portion 46 of a vehicle body. The trim 70 is integrally provided with a projection 72 which projects from an outside wall thereof.

The trim 70 including the projection 72 is composed of a solid rubber. The projection 72 has a leg portion 74 and a seal portion 76 having a triangular cross-section, which is formed at an end of the thin leg portion 74. Lips 78 and 80 are formed integrally with side walls of the seal portion 76, which contact opposite side walls 82 and 84 defining the channel 68, as seal surfaces thereagainst.

The side walls 82 and 84 respectively extend in the direction identical to the projecting direction of the projection 72. When a vehicle door is closed, the projection 72 enters the channel 68 while the lips 78 and 80 slide on the side walls 82 and 84.

In FIG. 4, parts similar to those in FIG. 3 are given the same number as therein. The sealing structure of the second embodiment achieves substantially the same operational advantages as those of the first embodiment.

Figure 5:
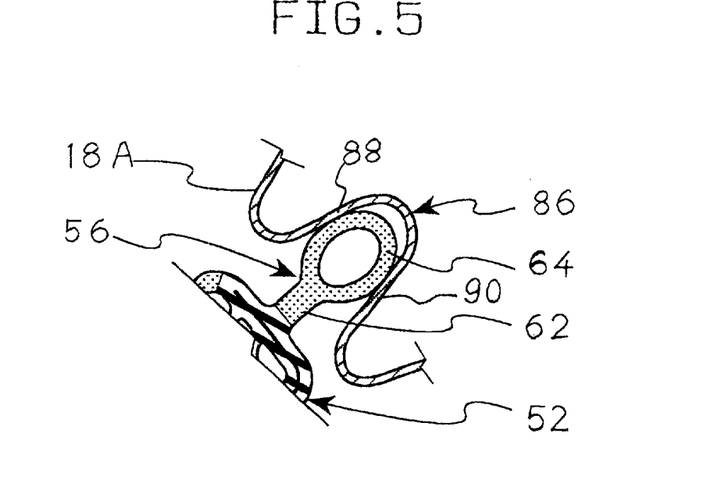
FIG. 5 is a cross-sectional view of a third embodiment of a sealing structure in accordance with the present invention, which is taken similarly to FIG. 3.

FIG. 5 illustrates one portion of a third embodiment of a sealing structure in accordance with the present invention.

A channel 86 which is formed in a doorframe 18A has a configuration that the width thereof gradually enlarges towards an opening thereof. Opposite side walls 88 and 90 are inclined to each other such that the distance therebetween gradually increases toward the opening of the channel 86. The remainder of the construction of the third embodiment is identical to that of the first embodiment.

When the relative position of a vehicle door and a door opening portion of a vehicle body varies in the vertical direction and/or horizontal direction thereof due to the scattering in the mounted state of the vehicle door on the vehicle body, the sealing structure of the present embodiment facilitates the entering of a seal portion 64 of a projection 56 into the channel 86. When the above-described relative position varies in directions of the width of the vehicle body, the entering depth of the projection 56 into the channel 86 varies, and consequently, the pressing force therebetween slightly varies, but the sealing performance is not seriously affected thereby.

Figure 6:
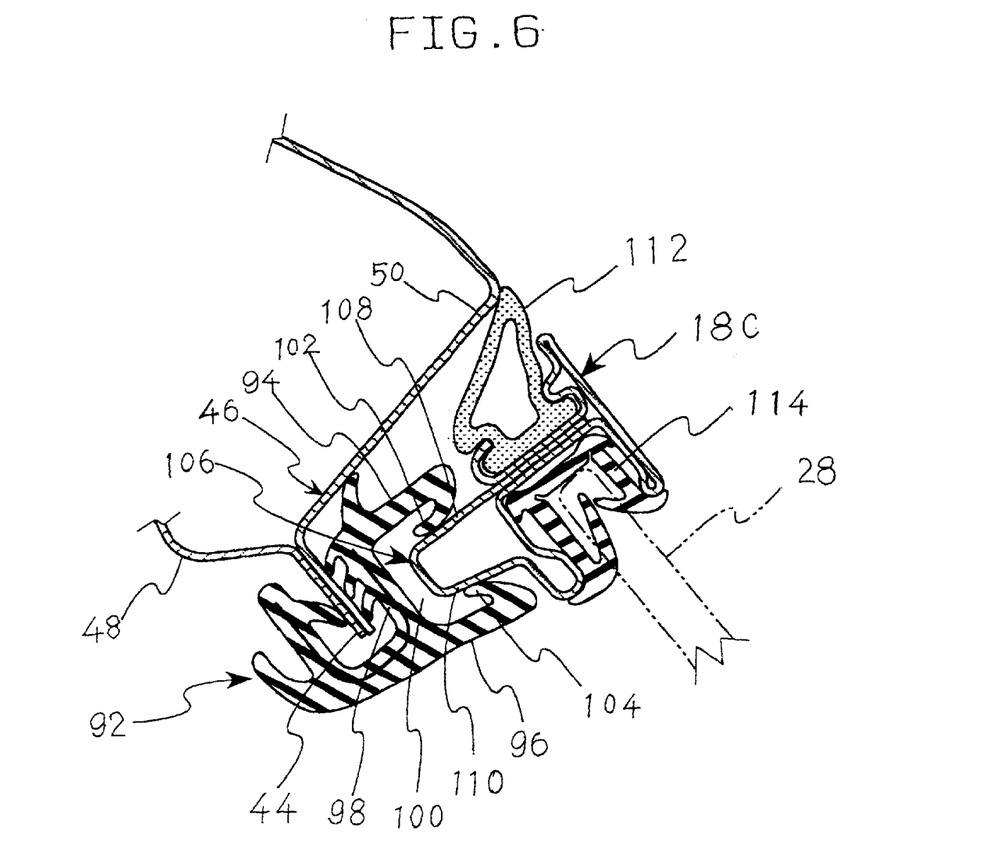
FIG. 6 is a cross-sectional view of a fourth embodiment of a sealing structure in accordance with the present invention, which is taken similarly to FIG. 3.

FIG. 6 illustrates a fourth embodiment of a sealing structure in accordance with the present invention. In the present embodiment, a channel is provided in a vehicle body while a projection is provided in a vehicle door.

A trim 92 having an approximately U-shaped cross-section is mounted on a flange 44 in a door opening portion 46 which is formed by joining end edges of an inner panel 48 and an outer panel 50. One pair of opposite side walls 94 and 96 project from a bottom and an open end of an outside wall 98 of the trim 92 in a direction approximately perpendicular thereto. The trim 92 and the opposite side walls 94 and 96 are integrally formed of rubber. The outside wall 98 and side walls 94 and 96 define a channel 100 which opens outwardly of a vehicle body, and has an approximately U-shaped cross-section. Seal lips 102 and 104 project from ends of the opposite side walls 94 and 96 in facing directions to make the width of the opening of the channel 100 less than that of the bottom thereof.

A projection 106 is provided inside a doorframe 18C so as to face the opening of the channel 100. The projection 106 is formed by bending the doorframe 18C into an approximately U-shaped cross-section. An upper wall 108 and lower wall 110, which respectively act as a seal surface against the seal lip 102 or 104, are approximately parallel to each other, and the distance between the upper wall 108 and lower wall 110 is made slightly greater than that between the seal lips 102 and 104.

A tubular sub-seal member 112 is mounted along an outer periphery of the doorframe 18C for sealing between the doorframe 18C and a facing door opening portion of the vehicle body, and a glass run 114 for sealing around a periphery of a door glass 28 is attached to the doorframe 18C.

When a vehicle door is closed, the parallel upper and lower walls 108 and 110 of the projection 106 provided in the doorframe 18C press against the seal lips 102 and 104 toward the opposite walls 94 and 96, and enters the channel 100 while sliding on the seal lips 102 and 104. Thus, the sealing structure of the present embodiment achieves operational advantages substantially equal to those of the preceding first through third embodiments.

Figure 7:
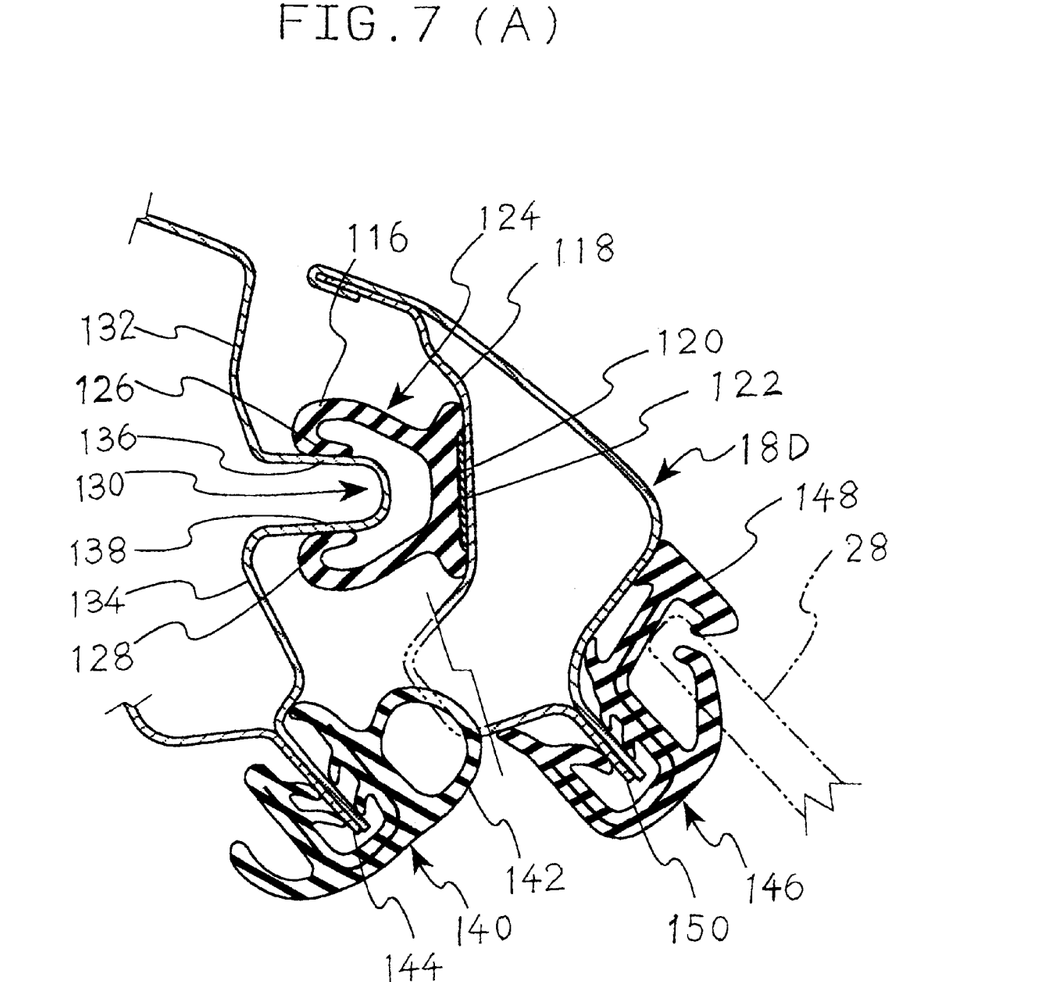
FIG. 7(A) is a cross-sectional view of a fifth embodiment of a sealing structure in accordance with the present invention, which is taken similarly to FIG. 3.
FIG. 7(B) is a view illustrating a modification of a U-shaped channel of FIG. 7(A)

FIG. 7(A) illustrates a fifth embodiment of a sealing structure in accordance with the present invention. The sealing structure of the present embodiment is equal to that of the first embodiment in that the channel is provided in the vehicle door and the projection is provided in the vehicle body, but is different therefrom in the position and configuration of the channel and projection.

As illustrated in FIG. 7(A), a rubber member 116 having a U-shaped cross-section is attached to an inside surface of an inner panel 118 of a doorframe 18D by bonding a bottom 120 of the rubber member 116 to the inner panel 118 with a double-sided adhesive tape 122 to define a channel 124. The rubber member 116 has seal lips 126 and 128 which respectively project from open ends thereof in facing directions.

A projection 130 is provided in a door opening portion 132 by bending an outer panel 134 thereof into a U-shaped cross-section so as to face the channel 124. An upper wall 136 and lower wall 138 of the projection 130 are made parallel to each other, or inclined such that the distance between the upper wall 136 and lower wall 138 gradually decreases toward a projecting end of the projection 130. The distance between the upper wall 136 and lower wall 138 (that is the width of the projection 130) is made slightly greater than that between the seal lips 126 and 128.

A trim 140 which is integrally provided with a tubular seal portion 142 in an outside wall thereof is mounted on a flange 144 provided in the door opening portion 132, and another trim 146 which is integrally provided with a glass run 148 for sealing a periphery of a door glass 28 is mounted on a flange 150 provided around a window opening of the doorframe 18D.

When a vehicle door is closed, the upper and lower walls 136 and 138 of the projection 130 press the seal lips 126 and 128 outwardly and enters the channel 124 while sliding on the seal lips 126 and 128. Thus, the sealing structure of the present embodiment achieves operational advantages substantially identical to those of the preceding embodiments. When the vehicle door is closed, the tubular seal portion 142 provided in the trim 140 contacts and presses against the inner panel 118 of the doorframe 18D inwardly of the channel 124. Thus a double sealing structure is effected with the combination of the channel 124 and the projection 120 in addition to the combination of the tubular seal portion 142 and the inner panel 118.

FIG. 7(B) illustrates a modification of the channel 124 of the fifth embodiment. A channel 152 is formed with a solid rubber member, and a seal wall 154 has a configuration which is obtained by continuously connecting the seal lips 126 and 128 of the rubber member 116 in the fifth embodiment (FIG. 7(A)) into a shallow U-shaped cross-section. A bottom 156 of the seal wall 154 has a wave-like configuration.

When a vehicle door is closed, the projection 130 provided in the vehicle body enters the channel 152, and a projecting end of the projection 130 along with the upper and lower walls 136 and 138 thereof contact the seal part 154 closely, thereby achieving especially excellent sealing performance.

If dust or the like is attached to the upper and lower walls 136 and 138 of the projection 130 in the fifth embodiment, the seal lips 126 and 128 (FIG. 7(A)) may be reversed with the backward movement of the projection 136, because of the friction resistance generated between the seal lips 126 and 128 and the projection 136, upon opening the vehicle door. In contrast, with the present modification illustrated in FIG. 7(B), such problem does not occur in the seal wall 154.

Figure 8:
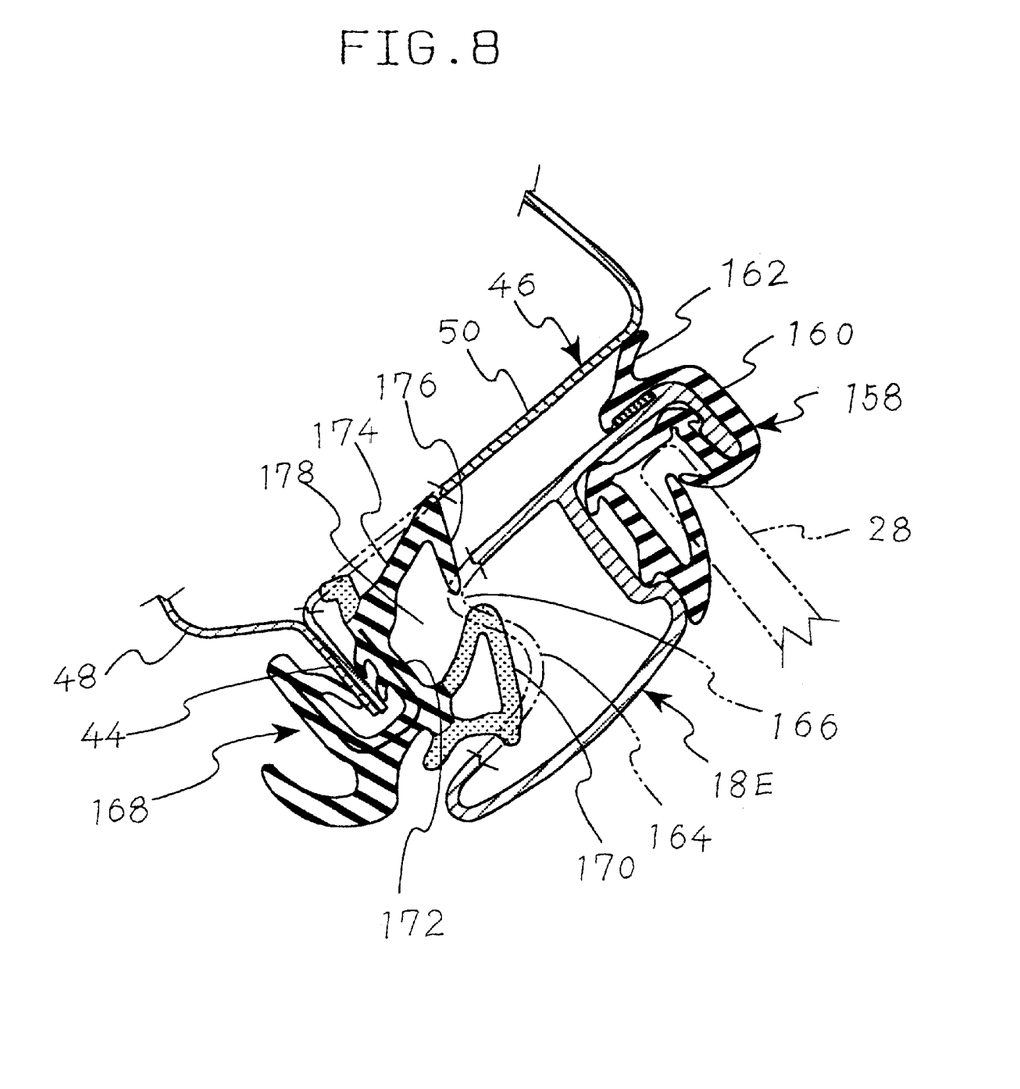
FIG. 8 is a cross-sectional view of a sixth embodiment of a sealing structure in accordance with the present invention, which is taken similarly to FIG. 3.

FIG. 8 illustrates a sixth embodiment of a sealing structure in accordance with the present invention. One channel and one projection are provided in a doorframe, and another projection and another channel are provided in a vehicle body such that one channel faces another projection while another channel faces one projection. When a door is closed, the projections in both of the doorframe and vehicle body enter the facing channels in both of the doorframe and vehicle body, thereby providing a double seal between the doorframe and vehicle body.

As shown, a glass run 158 is attached along an outside edge of a doorframe 18E. The glass run 158 has seal lips at open ends thereof for sealing around a periphery of a door glass 28. The glass run 158 is integrally provided with a molding 160 for covering an outer surface of the doorframe 18E, and a sub-seal portion 162 which extends from the molding 160. An end of the sub-seal portion 162 abuts a door opening portion 46 of a vehicle body when the door is closed.

The doorframe 18E has a channel 164 and a projection 166 which extend in a circumferential direction thereof parallel to each other. The channel 164 is defined by a gently curved concave wall of the doorframe 18E, and the projection 166 is defined by a gently curved convex wall thereof. Thus, the channel 164 and the projection 166 have a wave-shaped cross-section.

A trim 168 having a U-shaped cross-section is mounted on a flange 44 which is provided by joining end edges of an inner panel 48 and an outer panel 50 of a vehicle body. A tubular projection 170 is integrally formed with an outside wall 172 of the trim 168 so as to project from the position near a bottom of the trim 168 and face the channel 164. The projection 170 has an approximately triangular cross-section of which the width enlarges toward a projecting end thereof. The outside wall 172 of the trim 168 bends outwardly at an open end thereof into an L-shaped cross section to define an extension wall 174. The extension wall 174 has a lip 176 which projects from an extension end thereof, which is to abut the door opening portion 46 when attached, toward a side wall of the projection 170 so as to be spaced therefrom. Consequently, a channel 178 is defined by the side wall of the projection 170, the outside wall 172 of the trim 168, and the extension wall 174 having the lip 176. The tubular projection 170 is composed of a sponge rubber and the remaining portion is composed of a solid rubber.

When a vehicle door is closed, the wall defining the channel 164 of the doorframe 18E abuts the tubular projection 170 of the vehicle body, and at the same time, the projecting end of the projection 166 of the doorframe 18E enters an opening of the channel 178, whereby a double seal is formed between the doorframe 18E and the door opening portion 46 of the vehicle body.

With the present embodiment, even when the projections 166 and 170 do not enter the facing channels 178 and 164 deep, sufficiently good sealing properties can be effected with a double seal between the vehicle body and vehicle door. Furthermore, since a great entrance depth of each projection into each channel is not needed, a required force for closing the vehicle door can be decreased.

With the present invention, a continuous seal line with uniform sealing performance can be provided over the entire length around a door opening portion of a vehicle body against a periphery of a vehicle door irrespective of the local variations in the configuration of the door opening portion and the scattering in the mounted state of the vehicle door on the vehicle body, and consequently local lowering in the sealing performance can be prevented.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A sealing structure for sealing between a door opening portion of a vehicle body and a periphery of a vehicle door, comprising:

a channel formed in an inside surface of a metal doorframe of the vehicle door and extending in a circumferential direction thereof, said channel being defined by opposite side walls of said metal doorframe that extend in a direction in which the vehicle door is opened and closed;

a projection projecting from the door opening portion of the vehicle body and extending in a circumferential direction thereof, said projection including a leg portion capable of flexing to cancel a slight difference between an extending direction of said opposite side walls defining said channel and a projecting direction of said projection, and a tubular seal portion formed at an end of said leg portion, said tubular seal portion being adapted to enter said channel and contact said opposite side walls which define said channel such that a projecting end of said projection is spaced from a bottom of said channel when the vehicle door is closed, said projection being composed of an elastomeric material which is selected from the group consisting of rubber, soft resin, and thermoplastic elastomer.

2. A sealing structure as claimed in claim 1, wherein said opposite side walls of said channel are inclined such that a width of said channel is enlarged toward an open end thereof, and wherein said tubular seal portion has an approximately triangular cross-section, and defines seal surfaces for sliding on said opposite side walls when said projection enters said channel.

3. A sealing structure for sealing between a door opening portion of a vehicle body and a periphery of a vehicle door, comprising:

one channel and one projection which are formed in an inside surface of a metal doorframe of the vehicle door and which extend parallel to each other in a circumferential direction thereof; and another projection and another channel which are provided in the door opening portion of the vehicle body and which extend parallel to each other in a circumferential direction thereof, said another projection and said another channel being formed from an elastomeric material selected from the group consisting of rubber, soft resin, and thermoplastic elastomer, said one channel, said one projection, said another projection and said another channel being formed such that said one projection enters said another channel while said another projection enters said one channel when the vehicle door is closed, whereby a double seal is formed between the door opening portion of the vehicle body and the periphery of the vehicle door.

4. A sealing structure for sealing between a door opening portion of a vehicle body and a periphery of a vehicle door, comprising:

one channel and one projection formed in an inside surface of a doorframe of the vehicle door and extending in parallel to each other in a circumferential direction thereof; and another projection and another channel provided in the door opening portion of the vehicle body and extending in parallel to each other in a circumferential direction thereof, said another projection and said another channel being formed from an elastomeric material selected from the group consisting of rubber, soft resin and thermoplastic elastomer, said one projection formed in the doorframe of the vehicle door being adapted to enter said another channel in the vehicle body while said another projection in the vehicle body is adapted to enter said one channel formed in the vehicle door when the vehicle door is closed, whereby a double seal is formed between the door opening portion of the vehicle body and the periphery of the vehicle door, wherein said one channel is defined by a gently curved concave wall of said doorframe of the vehicle door, said one projection is defined by a gently curved convex wall of said doorframe, said another projection and said another channel are integrally formed with a trim which is mounted on the door opening portion of the vehicle body, said another projection has a tubular configuration with an approximately triangular cross-section and projects from said trim so as to contact said gently curved concave wall of said one channel of the vehicle door when the vehicle door is closed, and said another channel is defined by a side wall of said another projection and an extension wall which extends from said trim so as to be spaced from said side wall such that said another channel faces said one projection of said vehicle door when the vehicle door is closed.

5. A sealing structure as claimed in claim 4, wherein said another projection further includes a leg portion having a reduced thickness which makes said leg portion flexible and wherein said tubular seal portion is formed at an end of said leg portion.

* * * * *